United States Patent [19]
Jewett et al.

[11] Patent Number: 4,846,410
[45] Date of Patent: Jul. 11, 1989

[54] APPARATUS FOR MONITORING LOW-LEVEL COMBUSTIBLES

[75] Inventors: Scotty Y. Jewett, Lyndhurst; John W. Robertson, Jr., Chesterland; Gordon D. Woolbert, North Canton, all of Ohio

[73] Assignee: The Babcock & Wilcox Company, New Orleans, La.

[21] Appl. No.: 206,532

[22] Filed: Jun. 14, 1988

Related U.S. Application Data

[63] Continuation of Ser. No. 148,206, Apr. 26, 1986, Pat. No. 4,778,113, which is a continuation of Ser. No. 857,700, Apr. 29, 1986, abandoned.

[51] Int. Cl.$^4$ .............................................. B02C 25/00
[52] U.S. Cl. ........................................ 241/31; 241/33; 241/DIG. 14
[58] Field of Search .................... 241/31, 33, DIG. 14

[56] References Cited

U.S. PATENT DOCUMENTS 4,653,698  3/1987  Cooper et al. ......... 241/DIG. 14 X

FOREIGN PATENT DOCUMENTS 132974  2/1985  European Pat. Off. .... 241/DIG. 14

Primary Examiner—Timothy V. Eley
Attorney, Agent, or Firm—Vytas R. Matas; Robert J. Edwards

[57] ABSTRACT

A safety control system for a coal pulverizing mill is disclosed. The control system utilizes measurements of the net oxygen level and the carbon monoxide equivalent ($CO_e$) level of the combustible gases within the pulverizing mill. First levels of the net oxygen and the rate of carbon monoxide equivalent change in the pulverizing mill are utilized in a control logic system to actuate alarms. Second levels of the net oxygen and the carbon monoxide equivalent ($CO_e$) level in the pulverizing mill are utilized to accomplish the inerting of the mill.

6 Claims, 6 Drawing Sheets

APPARATUS FOR MONITORING LOW-LEVEL COMBUSTIBLES

This is a continuation of co-pending application Ser. No. 07/148,206, filed on 4/26/86 now U.S. Pat. No. 4,998,113; which is a continuation of application Ser. No. 06/857,700, filed 4/29/86, now abandoned.

TECHNICAL FIELD

The present invention generally relates to control systems for pulverizers and more particularly to an improved safety control system for detecting and controlling impending hazardous conditions in a coal pulverizing mill.

BACKGROUND ART

Coal usage has increased in the United States for a variety of reasons, particularly those of an economic nature. The utility industry is burning far more coal today than it did ten years ago. With the increased demand for coal, the use of younger, more volatile coals like subbituminous and lignite has increased. Consequently, the potential for spontaneous combustion causing serious fires and explosions during the handling, grinding and pulverizing steps has increased.

Several methods which have been given considerable attention for detecting impending pulverizing mill fires are based on measuring temperature, gas flow velocity and carbon monoxide. Single and multiple point temperature monitoring techniques have been used for a number of years to warn of an over-temperature condition in the mill. This approach, however, provides information too late to stop a fire from spreading. The gas flow velocity monitor approach has potential, but the relationship between gas flow, temperature and pressure are not sufficiently understood to be effective as a warning system. The increase in the carbon monoxide level in the pulverizing mill has been recently given the most attention in research and practice and is a way of detecting pulverizing mill fires.

A number of commercial devices utilizing infrared absorption techniques are available for monitoring carbon monoxide levels in the pulverizing mill. This method is based upon the principle that when coal starts to oxidize, i.e., the early stages of combustion, carbon monoxide is produced. Being able to detect this carbon monoxide at very low levels, e.g., 25 to 50 ppm, permits the mill operator to take precautionary measures to prevent a major fire or an explosion in the mill.

A small pocket of oxidizing coal can become a major fire through escalation or ignition. If escalation occurs, the oxidation process intensifies as the quantity of coal involved and temperature increase. Larger quantities of carbon monoxide are produced as the process escalates until a runaway condition is reached which results in a fire. This small quantity of oxidizing coal also represents an ignition source which combined with the other elements within the mill can result in a major fire or explosion. In this case, the quantity of carbon monoxide does not need to escalate prior to the fire or explosion since the small pocket of oxidizing coal is only an ignition source. From the foregoing, it is apparent that detection methods based upon carbon monoxide alone are useful only after oxidation has started and do not give the operator a good indication of potentially explosive conditions within the pulverizing mill. Other factors, such as the level of oxygen and combustible gases in the pulverizing mill, must be considered when evaluating the possibility of a fire or an explosion within the pulverizing mill.

Because of the foregoing it has become desirable to develop an improved safety control system for a pulverizing mill wherein a measurement of oxygen and an aggregate measurement of not only carbon monoxide but all combustible gases in the mill are made and utilized for controlling the operation of the mill and warning the operator of a potentially dangerous mill condition.

SUMMARY OF THE INVENTION

The present invention solves the aforementioned problems associated with the prior art and other problems inasmuch as it is not dependent upon measuring temperature, gas flow velocity or only carbon monoxide for determining the existence of a potentially dangerous condition within the pulverizing mill. The invention incorporates the use of a single point analyzer which is mounted directly to the pulverizing mill to provide continuous measurements of both the oxygen content and the carbon monoxide equivalent ($CO_e$) level of the pulverizing mill atmosphere. The measurement of the carbon monoxide equivalent ($CO_e$) level includes not only the level of carbon monoxide in the pulverizing mill but also the other combustible gases, such as hydrogen, methane, ethane, etc., in the mill. The oxygen portion of the analyzer uses a sensor operating at a temperature where any combustible volatile material will combine with the oxygen in the sample that is extracted from the pulverizing mill. The sensor will then respond to the free or uncombined oxygen remaining. The resulting measurement, referred to as the net oxygen ($O_2$) level, is then compared with various predetermined setpoints and correlated with the carbon monoxide ($CO_e$) level which is similarly compared with various predetermined setpoints, to determine if a potentially dangerous condition exists within the pulverizing mill. Thus, measurements of both the net oxygen ($O_2$) level and the carbon monoxide equivalent ($CO_e$) level in the pulverizing mill atmosphere are used to determine the onset of conditions within the mill which might lead to a fire or explosion in same.

DESCRIPTION OF THE PREFERRED EMBODIMENT

Figure 1:
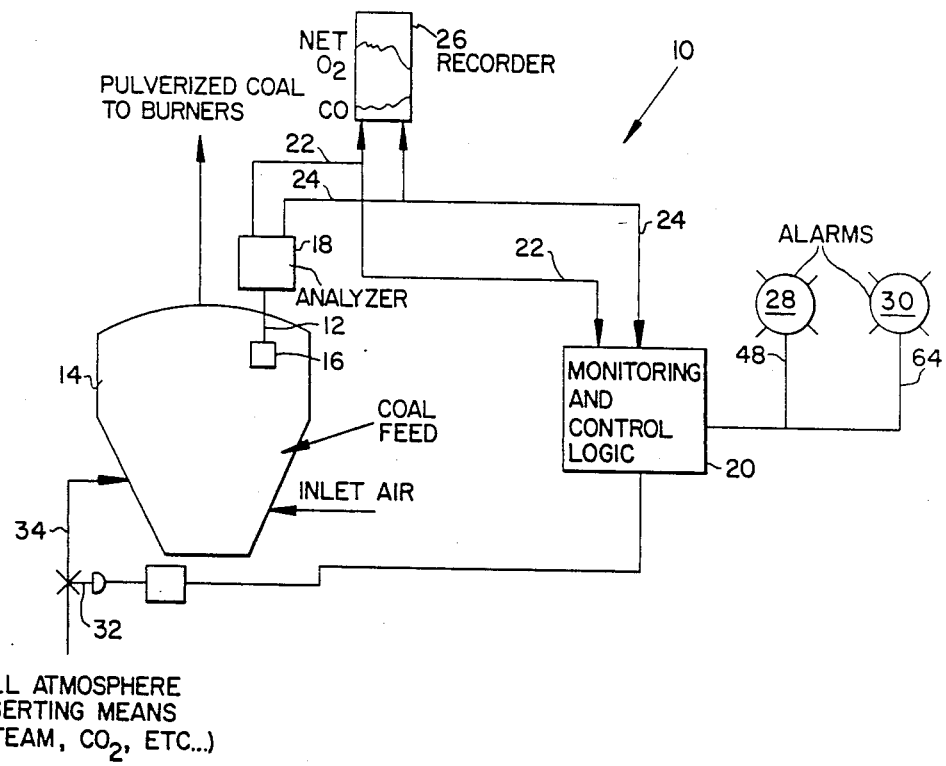
FIG. 1 is a schematic drawing of the safety control system of the present invention.

Referring now to the drawings where the illustrations are for the purpose of describing the preferred embodiment of the present invention and are not intended to limit the invention hereto, FIG. 1 is a schematic drawing of the safety control system 10 of the present invention. As such, the control system 10 can be integrated in a facility's control system designed to monitor the performance of and detect impending fire or explosions in industrial coal pulverizing mills by monitoring the net oxygen ($O_2$) level and the carbon monoxide equivalent ($CO_e$) level of the combustible components in the pulverizing mill atmosphere. The measurement of the carbon monoxide equivalent ($CO_e$) level of the combustible components includes not only carbon monoxide but also other combustibles components such as hydrogen, methane, ethane, and other higher hydrocarbon components. The combined measurement of the $CO_e$ and net $O_2$ levels in the pulverizing mill atmosphere is used to indicate the oxidation rate of the coal to prevent spontaneous combustion within the mill. In addition, the measurement of the net $O_2$ level, when combined with other measurements, can provide the basis for overall mill performance calculations and the quality of the pulverized coal.

As shown in FIG. 1, $CO_e/O_2$ sample probe 12 is usually placed in a coal pulverizing mill 14 outlet zone. A sample gas in drawn through the probe 12 which is provided with a high temperature filter 16. The filter 16 is required to maintain trouble-free operation of the control system 10 by minimizing the amount of particulate matter drawn into the analyzer. A filter 16 which can be used for this application is of a type described in U.S. Pat. No. 4,286,472.

The air sample drawn from the coal pulverizer is then analyzed for percent by volume of oxygen ($O_2$) content and the carbon monoxide equivalent ($CO_e$) concentration of combustible components in ppm (parts per million) via a known oxygen and $CO_e$ gas analyzer 18 designed to operate in a harsh power plant environment and having autocalibration capabilities. Electrical signals corresponding to the net oxygen ($O_2$) level i.e., the level of the free or uncombined oxygen within the sample remaining after the combustible volatile materials therein have combined the oxygen in the sample, and the carbon monoxide equivalent ($CO_e$) level are transmitted respectively to a monitoring and control logic assembly 20 located in a central control room via lines 22 and 24. The net $O_2$ and $CO_e$ levels are displayed and/or recorder on a strip-chart recorder 26. If the net $O_2$ level falls below a predetermined rise level, the system 10 actuates audible and visible alarms 28, 30, respectively, to alert the operator who, in turn, may manually take corrective action to inert the pulverizing mill 14 or permit the system 10 to continue until it initiates an automatic inert mode of operation to bring the pulverizing mill 14 operating parameters back under control.

Figure 2:
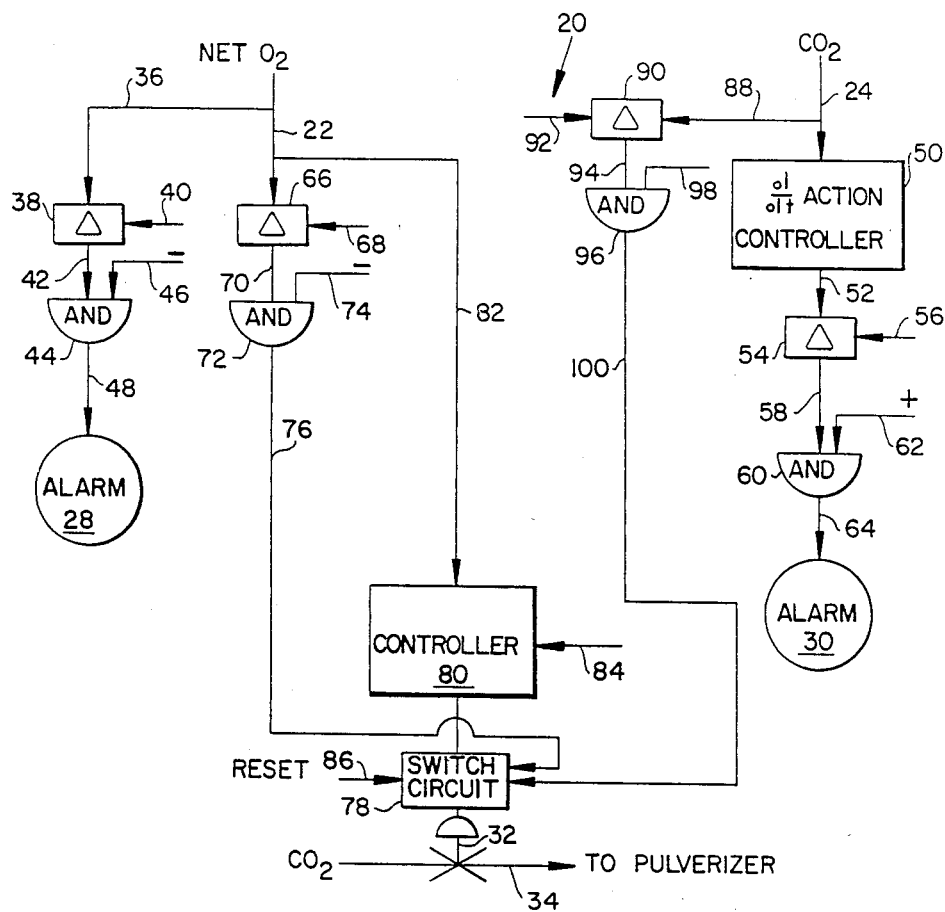
FIG. 2 is a schematic drawing of the monitoring and control logic assembly of the safety control system illustrated in FIG. 1.

Referring now to FIG. 2, the monitoring and control logic assembly 20 utilizes both the net oxygen ($O_2$) measurement provided by the analyzer 18 along line 22 as well as the carbon monoxide equivalent ($CO_e$) measurement provided along line 24 from the analyzer 18 to actuate the alarms 28, 30, respectively at a predetermined net oxygen ($O_2$) level and at a predetermined carbon monoxide equivalent ($CO_e$) rise level. In addition, when the net oxygen ($O_2$) level and/or the absolute carbon monoxide equivalent ($CO_e$) level exceed certain critical limits, automatic inerting of the pulverizing mill 14 is undertaken by controlling the opening of a valve 32 which permits some inerting media, such as carbon dioxide or steam, to flow along a line 34 into the pulverizing mill 14.

As for the alarm functions, the net oxygen ($O_2$) measurement from line 22 is transmitted along a line 36 to a difference station 38 having a setpoint set at a predetermined net oxygen control point provided along a line 40. The difference station 38 compares the actual net oxygen ($O_2$) measurement provided by the analyzer 18 with the setpoint ney oxygen level and provides an error signal along a line 42 which is one input to an AND gate 44. The other input to the AND gate 44 is provided by a constant negative signal from a predetermined source along a line 46. Thus, as long as the net oxygen ($O_2$) level provided to the difference station 38 is greater than setpoint net oxygen level, a positive error signal will be transmitted along line 42 to the AND gate 44 which will then fail to provide any control signal alone a line 48, thus failing to actuate the alarm 28. As soon as the net oxygen ($O_2$) level drops below the setpoint net oxygen level, the error signal transmitted along line 42 will become negative and, in combination with the constant negative signal provided on line 46, results in the conduction of the AND gate 44 causing a control signal to be transmitted along line 48 to the alarm 28 actuating same and providing an indication of potential problems with respect to the atmosphere in the pulverizing mill 14.

Alternatively, the signal representative of the measured carbon monoxide equivalent ($CO_e$) level which is transmitted along line 24 may also provide an actuation of the alternate alarm 30. The measured carbon monoxide equivalent ($CO_2$) level signal is transmitted to a derivative action controller 50 which is sensitive to any variations in the carbon monoxide equivalent ($CO_e$) level and provides an output signal along a line 52 indicative of the slope or rate of change of the carbon monoxide equivalent ($CO_e$) level in the pulverizing mill 14. The output of the derivative action controller 50 is transmitted along line 52 to a difference station 54 having a predetermined setpoint provided along a line 56 representative of a rate of change of the carbon monoxide equivalent ($CO_e$) level which would indicate coal ignition in the pulverizing mill 14. The output of the difference station 54 is transmitted along a line 58 to an AND gate 60 having a second input of a constant positive value provided along a line 62. In operation, the rate of change of the carbon monoxide equivalent ($CO_e$) level normally stays below the setpoint applied to the difference station 54 resulting in a negative output signal from this station 54 along line 58. Whenever the actual rate of change of the carbon monoxide equivalent ($CO_e$) level in the pulverizing mill exceeds the setpoint provided along line 56 to this difference station 54, the signal transmitted along line 58 becomes positive, causing the AND gate 60 to conduct resulting in the transmission of a control signal along a line 64 to the alarm 30 actuating same to indicate the existence of a potentially dangerous condition in the pulverizing mill 14.

The foregoing alarms 28 and 30, when actuated, warn the operator of a potentially dangerous condition in the pulverizing mill 14. These alarms should indicate to the operator that close monitoring of the pulverizing mill 14 is required and generally one alarm will be actuated, possibly followed by a second alarm. Since the inerting of the pulverizing mill 14 may shock the pulverizer, such inerting is left to the discretion of the operator. There are, however, certain conditions beyond which inerting of the pulverizing mill 14 is mandatory and must be automatically initiated. To provide for such automatic inerting of the pulverizing mill 14, the control system 10 again utilizes both the net oxygen ($O_2$) measurements and the carbon monoxide equivalent ($CO_e$) measurements provided via lines 22 and 24, respectively.

Automatic inerting of the pulverizing mill 14 is actuated by a difference station 66 which has a net oxygen level setpoint provided to it along a line 68. The net oxygen level setpoint provided to the difference station 66 is significantly lower than the setpoint level provided to the difference station 38. Thus, during normal operation of the pulverizing mill 14, the net oxygen ($O_2$) level measured and transmitted to the difference station 66 will exceed the setpoint applied thereto and the error signal produced by the difference station 66 will be a positive signal which is transmitted along a line 70 to an AND gate 72. The other input of the AND gate 72 is provided by a constant negative signal along a line 74. Thus, during normal operation of the pulverizing mill 14, the inputs to the AND gate 72 will be positive and negative, resulting in no control signal being transmitted from the AND gate 72 along a line 76. Whenever the net oxygen ($O_2$) level within the pulverizing mill 14 falls below the setpoint level applied to the difference station 66, the output of this station 66 becomes negative, providing two negative inputs to the AND gate 72 resulting in the transmission of a control signal along line 76 to a switching circuit 78. The switching circuit 78 is a normally open circuit, preventing the signal from a controller 80 from reaching the control valve 32. When a control signal is present along line 76, the switching circuit 78 changes to a closed circuit condition, which results in the controller 80 being responsible for the operation of the valve 32.

One input to the controller 80 is the actual net oxygen ($O_2$) level in the pulverizing mill 14 and is provided by a line 82, which is connected to line 22. The setpoint for the controller 80 is provided along a line 84 from some setpoint station and the level of this setpoint is typically between the setpoint levels for difference stations 66 and 38. Thus, when the switching circuit 78 is actuated by a control signal from the AND gate 72, indicating that the net oxygen ($O_2$) level within the pulverizing mill 14 has fallen below the setpoint level to the difference station 66, the controller 80 will open valve 32 causing an inerting atmosphere, such as carbon dioxide, to be delivered to the pulverizing mill 14 until a somewhat normal net oxygen level is reached close to the setpoint level for the controller 80. Typically, the setpoint level for the controller 80 is kept somewhat lower than normal atmosphere to minimize the shock to the pulverizer 14 due to the inerting process. When the net oxygen ($O_2$) level in the pulverizing mill 14 reaches the setpoint level for the controller 80, the switching circuit 78 can then be reset to its normally open condition by a reset signal along a line 86 from either a manual source or an automatic source tied to some parameter indicative of the establishment of normal operating conditions within the pulverizing mill 14.

The actuation of the automatic inerting means is also alternatively done upon the sensing of a predetermined absolute carbon monoxide equivalent ($CO_e$) level in the pulverizing mill 14. The carbon monoxide equivalent ($CO_e$) signal normally provided on line 24 is tapped by a line 88 to provide one input to a difference station 90. The setpoint of the difference station 90 is provided along a line 92 from a setpoint station and the level of this setpoint is typically set at the maximum carbon monoxide equivalent ($CO_e$) level which can be tolerated in the pulverizing mill 14. Thus, as long as the carbon monoxide equivalent ($CO_e$) level stays below the setpoint for the difference station 90, a positive error signal will be transmitted by the difference station 90 along a line 94 to an AND gate 96. The other input to the AND gate 96 is a constant negative signal provided along a line 98. Thus, during normal operation of the pulverizing mill 14, opposite polarity signals are applied to the inputs to the AND gate 96, preventing the transmission of any control signal along a line 100 from the AND gate 96. Whenever the absolute carbon monoxide equivalent ($CO_e$) level exceeds the setpoint level applied to the difference station 90, the error signal transmitted to the AND gate 96 becomes negative, causing the conduction of the AND gate 96 and the establishment of a control signal along line 100 to the switching circuit 78. As was previously described with respect to the net oxygen ($O_2$) level control, the foregoing causes the switching circuit 78 to be conductive, turning control of the valve 32 over to the controller 80. In this manner, automatic inerting of the pulverizer 14 will occur until a reset signal is established along line 86, causing the switching circuit 78 to again become nonconductive and causing the valve to switch back to its normally closed position.

Figure 3:
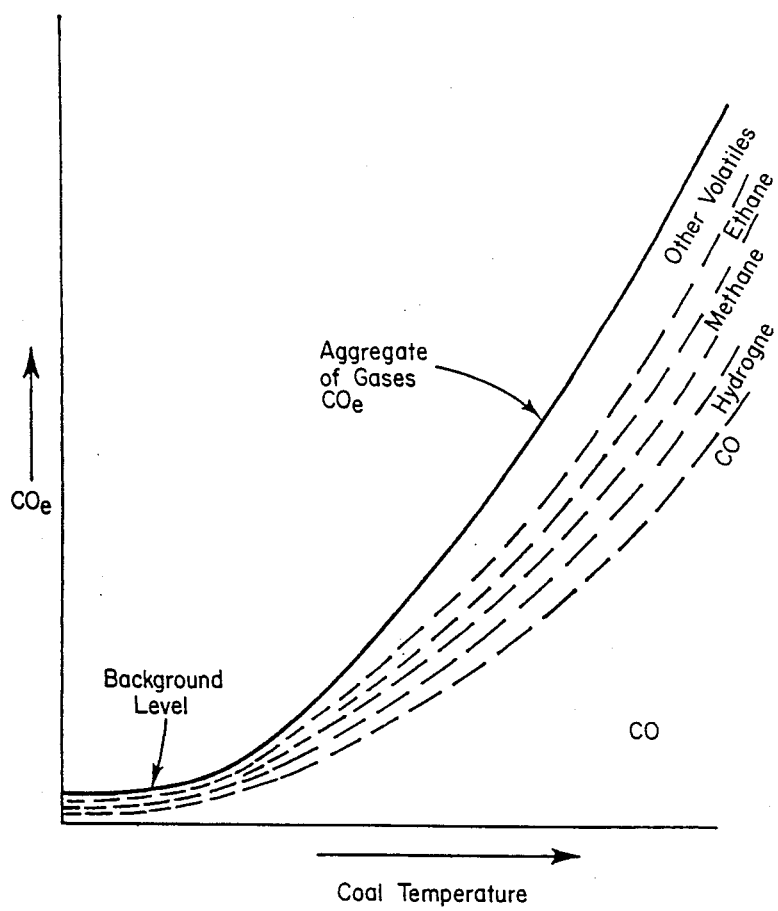
FIG. 3 is a graph of the relationship of the carbon monoxide equivalent ($CO_e$) level and the net oxygen ($O_2$) level in a coal pulverizing mill to the various combustible components which comprise same versus coal temperature.

Oxygen, fuel and an ignition source must be present in the pulverizing mill in order for a fire or explosion to occur. The grinding of the coal in the pulverizing mill releases hydrogen, methane, ethane and other combustible hydrocarbons. Carbon monoxide is present only in very low levels during the grinding process unless the oxidation process has commenced. Once the oxidation process has commenced and the coal temperature rises, all of the foregoing combustible gases will evolve and can be utilized as an indicator of a potentially dangerous condition. FIG. 3 shows the general relationship of the resulting carbon monoxide equivalent ($CO_e$) level in the pulverizing mill to the various combustible gaseous components which comprise same versus increasing coal temperature. As shown in this Figure, measuring the aggregate of all these gaseous components produces a response that is significantly more pronounced than that based only upon carbon monoxide and eliminates the limitations resulting from relying on only one gas, viz., carbon monoxide.

Figure 4:
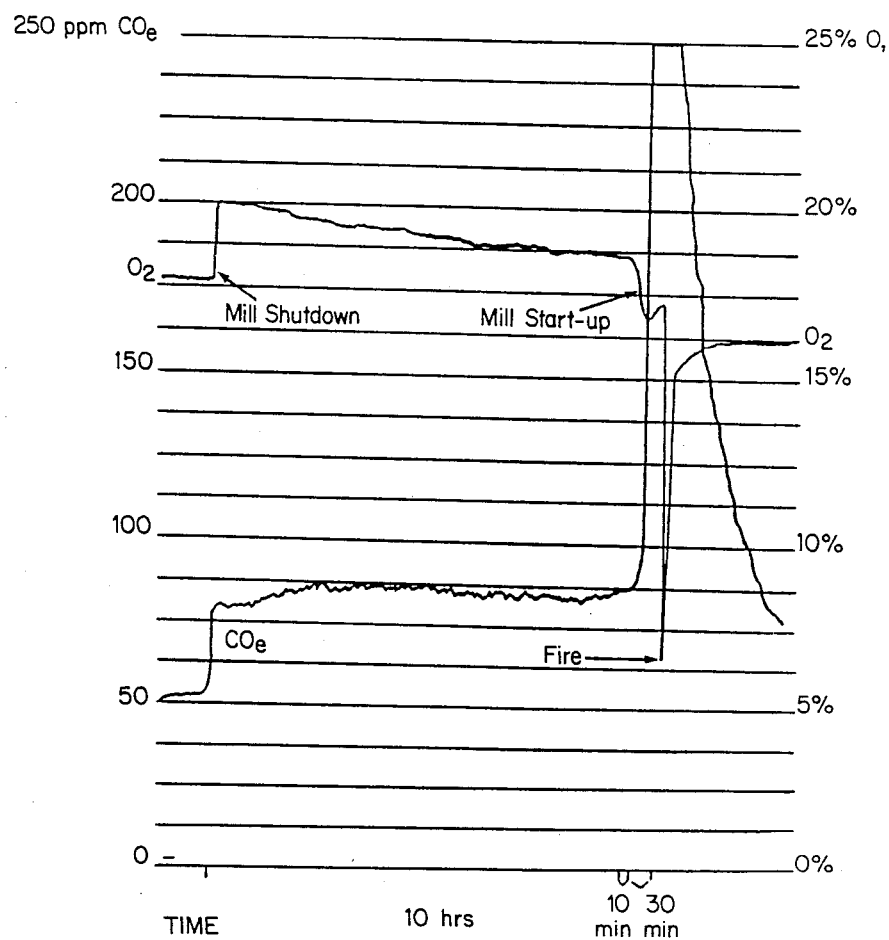
FIG. 4 is a graph of the relationship of the carbon monoxide equivalent ($CO_e$) level and the net oxygen ($O_2$) level in a pulverizing mill versus time and illustrates the changes in these levels when a fire occurs in the mill.

It has been found that most pulverizing mill fires are preceded by a significant increase in the carbon monoxide equivalent ($CO_e$) level in the mill. This increase appears to be caused by the oxidation of a small pocket of coal within the bowl or underbowl area. Investigations have shown that such pockets of oxidizing coal can exist for a long period of time within the mill and have the potential of igniting a runaway fire at any time. Such pockets cannot be detected by using previous methods of detection but can be detected through the use of the present invention, as shown in FIG. 4. This Figure illustrates a fire that was preceded by elevated carbon monoxide equivalent ($CO_e$) levels indicating the presence of smoldering coal in the pulverizing mill. Approximately ten minutes after the start-up of the pulverizing mill the carbon monoxide equivalent ($CO_e$) level increased to 250 ppm; thirty minutes after the increase in the carbon monoxide equivalent ($CO_e$) level, the oxygen ($O_2$) level spiked down to 5% and the mill temperature went out of control indicating the presence of a fire within the mill. The fire was quickly extinguished by increasing the coal feed, however, observation of sparks from the underbowl section verified that a fire had occurred and that coal was still smoldering in the mill. The carbon monoxide equivalent ($CO_e$) level then gradually decreased to approximately 35 ppm over the next seven hours. This indicated that the smoldering coal gradually burned itself out, however, the potential for a second fire during this period was indicated by the high carbon monoxide equivalent ($CO_e$) level.

Figure 5:
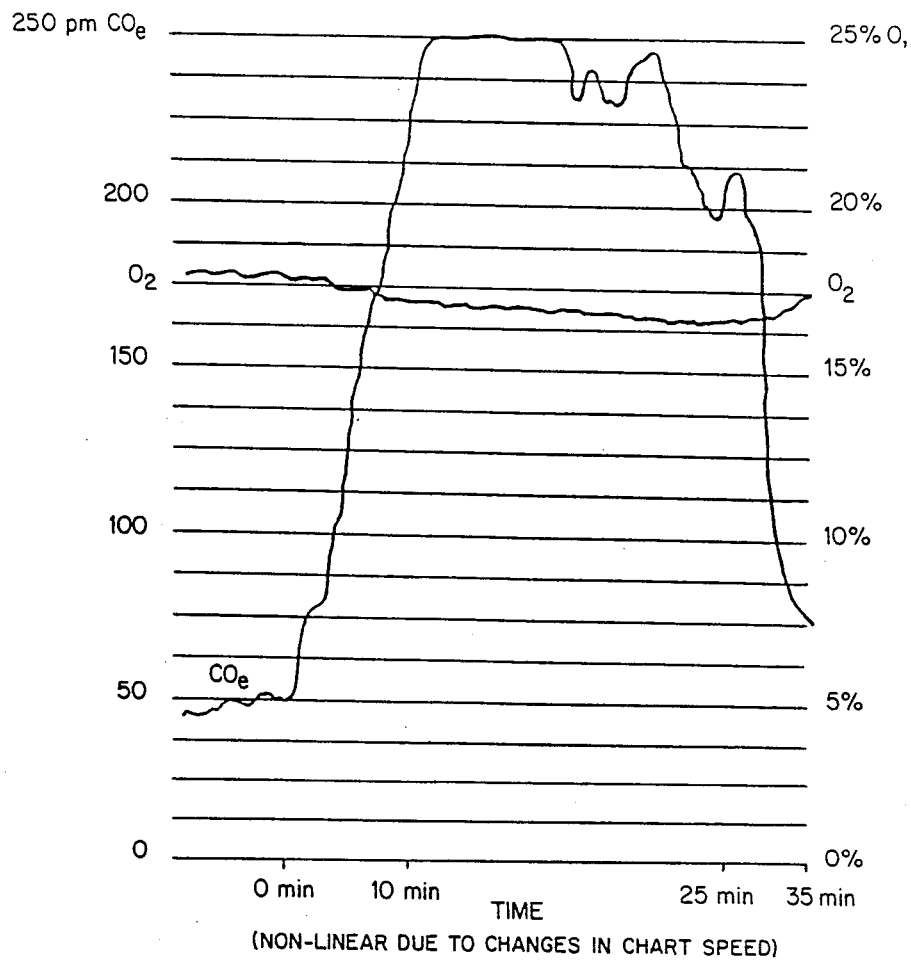
FIG. 5 is a graph of the relationship of the carbon monoxide equivalent ($CO_e$) level and the net oxygen ($O_2$) level in a coal pulverizing mill versus time and illustrates the changes in these levels when a smoldering fire exists in the mill but ignition does not occur.

An example of a smoldering fire which did not ignite the pulverizing mill is shown in FIG. 5. As shown in this Figure, approximately one-half hour after start-up of the mill, the carbon monoxide equivalent ($CO_e$) level increased from 35 ppm to 225 ppm. The carbon monoxide equivalent ($CO_e$) level remained at this high level and the net oxygen ($O_2$) level fell slightly from 17.75% to 16.75%. The carbon monoxide equivalent ($CO_e$) and net oxygen ($O_2$) levels then returned to their normal levels. Investigation of the pulverizing mill revealed a small quantity of coal smoldering in the mill for thirty minutes. The quantity of smoldering coal was not large enough to ignite the mill.

From the foregoing it is apparent that monitoring the carbon monoxide equivalent ($CO_e$) level in the pulverizing mill provides a significantly improved method for the early detection of a potentially dangerous condition in the mill so that the necessary corrective measures can be taken to avert a fire or explosion in same. Such early detection is not possible with the detection methods previously available.

Figure 6:
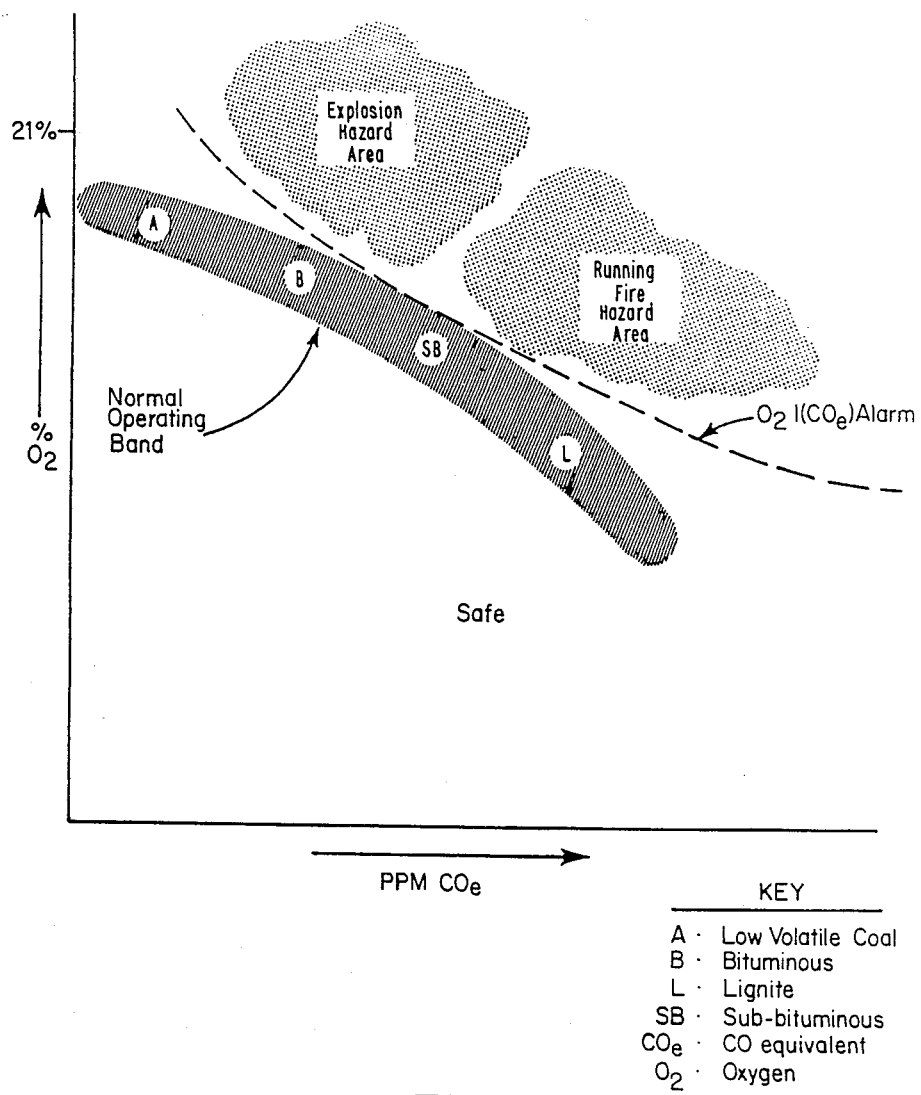
FIG. 6 is a graph of the net oxygen ($O_2$) level versus carbon monoxide equivalent ($CO_e$) level in a pulverizing mill and illustrates the manner in which will operating conditions depend upon the foregoing levels.

In summary, FIG. 6 illustrates the general relationship of the carbon monoxide equivalent ($CO_e$) level, net oxygen ($O_2$) level, and pulverizer mill condition. The normal operating band shows a general relationship between carbon monoxide equivalent ($CO_e$) level, net oxygen ($O_2$) level, and the type of coal used. As the percent volatile material in the coal increases, so does the expected carbon monoxide ($CO_e$) equivalent level. As the percent moisture increases, the net oxygen ($O_2$) level will decrease due to resulting higher moisture levels in the pulverizing mill gases. Rises in the carbon monoxide equivalent ($CO_e$) level combined with a constant or dropping net oxygen ($O_2$) level indicates a smoldering condition with a potential for a pulverizer mill fire. Conversely, increasing carbon monoxide equivalent ($CO_e$) level indicates that the pulverizing mill is in a potentially explosive condition. From the foregoing, the value of measuring and determining the carbon monoxide equivalent ($CO_e$) level, in conjunction with the net oxygen ($O_2$) level, is apparent in determining the onset of a potentially dangerous condition in the pulverizing mill.

Certain modifications and improvements will occur to those skilled in the art upon reading the foregoing. It should be understood that all such modifications and improvements have been deleted herein for the sake of conciseness and readability but are properly within the scope of the following claims.

We claim:

1. An improved safety system for extinguishing a fire in a coal pulverizing mill in response to a combined measurement of carbon monoxide and other combustible gases which indicate a fire in the mill comprising:
   means for measuring a level of carbon monoxide and other gases in the coal pulverizing mill and establishing a signal indicative thereof;
   means for comparing said signal from said measuring means with a predetermined setpoint signal indicative of a hazardous level of carbon monoxide and other combustible gases in the coal pulverizing mill and establishing a first control signal therefrom; and
   inerting means responsive to said first control signal for inerting the coal pulverizing mill in advance of an oxygen measurement indicative of such a fire.

2. The improved safety system as defined in claim 1, wherein said inerting means comprises:
   a source of inerting atmosphere for inerting the coal pulverizing mill;
   valve means for controlling said source of inerting atmosphere; and
   controller means responsive to said first control signal from said comparing means for controlling said valve means.

3. The improved safety system as defined in claim 2, further including:
   means for measuring the net oxygen level in the coal pulverizing mill and establishing a signal indicative thereof;
   means for comparing said signal from said net oxygen level measuring means with a first predetermined setpoint signal indicative of a potentially hazardous net oxygen level in the coal pulverizing mill and establishing a second control signal therefrom; and
   alarm means responsive to said second control signal to indicate a potentially hazardous condition in the coal pulverizing mill.

4. The improved safety system as defined in claim 3, further including:
   means for comparing said signal from said net oxygen level measuring means with a second predetermined setpoint signal lower than said first predetermined setpoint signal indicative of a potentially hazardous net oxygen level in the coal pulverizing mill and establishing a third control signal therefrom; and
   said controller means also being responsive to said third control signal for controlling said valve means.

5. The improved safety system as defined in claim 4, further including switching means connected between said controller means and said valve means and being responsive to control signals from either said comparing means which compares the level of carbon monoxide and other combustible gases in the coal pulverizing mill with a predetermined setpoint signal or said comparing means which compares the net oxygen level in the coal pulverizing mill with said second predetermined setpoint signal for allowing control of said valve means by said controller means.

6. A safety system for a coal pulverizing mill based on a signal indicative of the level of carbon monoxide and other combustibles in the mill comprising:
   means for measuring a net oxygen level in the coal pulverizing mill and establishing a signal indicative thereof;

means for determining a change in the level of carbon monoxide and other combustible gases in the coal pulverizing mill and establishing a signal indicative thereof;

comparing means for comparing said signals established by said measuring means and said determining means with predetermined setpoint signals for establishing independent control signals whenever the respective predetermined setpoint signal is exceeded; and means responsive to either of said first or second independent control signals for indicating a potentially hazardous condition in the coal pulverizing mill whereby the first control signal provides the primary advance control and said second signal acts as a back up safety signal should be the first signal malfunction.

* * * * *